A. MILLIGAN.
AUTOMATIC RETAINING VALVE FOR AIR BRAKE SYSTEMS.
APPLICATION FILED DEC. 6, 1910. RENEWED OCT. 4, 1911.

1,008,353. Patented Nov. 14, 1911.

WITNESSES
C. K. Davis.
L. B. Aveilhé

INVENTOR
Archie Milligan
by Brock Beckent Smith
Attorney

UNITED STATES PATENT OFFICE.

ARCHIBALD MILLIGAN, OF OGDEN, UTAH.

AUTOMATIC RETAINING-VALVE FOR AIR-BRAKE SYSTEMS.

1,008,353. Specification of Letters Patent. Patented Nov. 14, 1911.

Application filed December 6, 1910, Serial No. 595,984. Renewed October 4, 1911. Serial No. 652,847.

*To all whom it may concern:*

Be it known that I, ARCHIBALD MILLIGAN, a citizen of the United States, residing at Ogden, Utah, have invented certain new and useful Improvements in Automatic Retaining-Valves for Air-Brake Systems, of which the following is a specification.

My invention relates to automatic retaining valves designed to retain the pressure in a brake cylinder of an air brake system while the auxiliary reservoir communicating with the brake cylinder is being recharged with compressed air.

Figure 1:
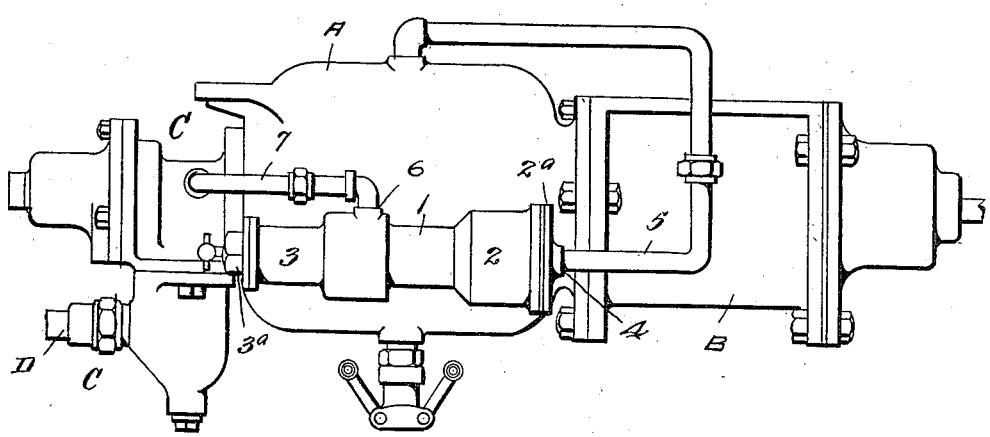
Figure 2:
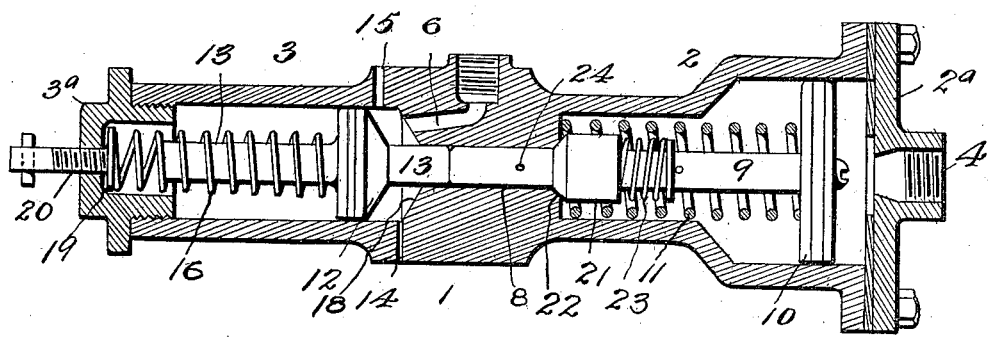
Figure 3:
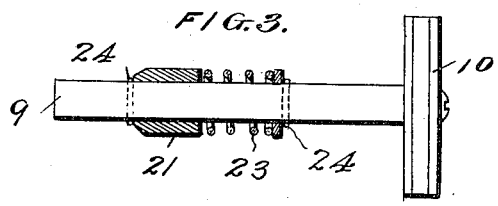

Referring to the drawings: Figure 1 is a side elevation of part of an air brake system, showing my improved automatic retaining valve applied thereto. Fig. 2 is a longitudinal cross section of the valve. Fig. 3 is a detail of the check valve.

Referring to Fig. 1 reference letter A indicates the auxiliary reservoir, B the brake cylinder and C the triple valve connected with the auxiliary reservoir, brake cylinder and train pipe D of the ordinary Westinghouse air brake system. The exhaust from the brake cylinder on releasing the brakes, instead of being allowed to discharge directly into the atmosphere, is conveyed through a retaining valve automatically controlled by the auxiliary reservoir, or, rather, by the amount of pressure in the auxiliary reservoir. Suppose the train line pressure has been reduced and the triple valve shifted to cut off communication between the train line pipe and the auxiliary reservoir, and to open communication between the auxiliary reservoir and the brake cylinder, or in other words, to set the brakes. This results in a reduction of pressure in the auxiliary reservoir. It is now desired to recharge the auxiliary reservoir to operative pressure, say 65 pounds per square inch, without releasing the brakes. In shifting the triple valve to accomplish this object, the exhaust port of the brake cylinder is opened. To prevent the air from exhausting and releasing the brakes during this recharging operation, a retaining valve, automatically controlled by the pressure in the auxiliary reservoir, is interposed between the exhaust from the brake cylinder and the atmosphere.

My invention is particularly designed to overcome two difficulties heretofore inherent in retaining valves by (1) providing means for exhausting the air from the brake cylinder slowly and gradually enough to allow the auxiliary reservoir to be fully recharged before it is desired to set the brakes again, and by (2) providing an adjustable check valve to prevent leakage from the auxiliary reservoir through the retaining valve to the brake cylinder, which would result in improperly setting the brakes.

Again referring to the drawings, 1 is the casing of the valve, having cylinders 2 and 3 therein at either end 2ª is a pressure head closing cylinder 2, and 3ª is a cap nut at the end of cylinder 3. An opening 4 in the pressure head 2ª communicates with a pipe 5 leading from the auxiliary reservoir. An opening 6 near the inner end of cylinder 3 communicates with a pipe 7 leading from the exhaust port of the brake cylinder through the triple valve. Cylinders 2 and 3 of the casing are connected by a cylindrical bore or guideway 8 in the center of the casing.

A spring-pressed release piston 9 having a piston head 10 is mounted in cylinder 2. The inner end of the piston reciprocates within the guideway 8.

A spring-pressed retaining valve 12 is mounted in the cylinder 3. A stem 13 of this valve reciprocates within the guideway 8. The heavy spring 11 of piston 9 holds the piston head 10 against the pressure head 2ª and the end of the piston 9 out of contact with the stem 13, unless overcome by a pressure of 70 pounds or more in the auxiliary cylinder.

Cylinder 3 is provided with partial exhaust port 14 and full exhaust port 15. Port 14 is disposed at the extreme inner end of the cylinder and port 15 is spaced some distance from the inner end of the cylinder. The two exhaust ports provide a slow and gradual exhaust from the cylinder. A comparatively light spring 16 presses the retaining valve 12 against its seat 18. The outer end of the spring 16 bears against a socket seat 19 attached to a threaded screw 20 mounted in the cap nut 3ª. By means of the screw 20 the tension of the spring 16 may be regulated to correspond with the brake cylinder pressure desired.

Slidingly mounted on the release piston 9 is a check valve 21 which fits against a seat 22 in the release cylinder 2. When the release piston 9 is in its normal position the check valve is held against its seat by the tension of its spring 23, as shown in Fig. 3. When the release piston is in release position, as shown in Fig. 2, the spring 23 is compressed and the check valve is still held to its seat. The spring 23 is positioned by pins 24 or other suitable means.

The operation is as follows: Suppose the brakes are set, that is, communication has been opened between the auxiliary reservoir and the brake cylinder, and the exhaust from the brake cylinder is closed. It is desired to recharge the auxiliary reservoir up to normal capacity, say 65 pounds, while the brakes are set. A shifting of the triple valve to open the desired communication between the train line pipe and the auxiliary reservoir, opens the exhaust from the brake cylinder through the triple valve. This exhaust is, however, conveyed through the retaining valve, which is held in place by the spring 16 tensioned to overcome a pressure of, say, 15 to 20 pounds in the brake cylinder. The spring 11 is tensioned to be overcome by a pressure of 70 pounds against the piston head 10. When it is desired to release the brakes the auxiliary reservoir may therefore be charged up to a pressure of 70 pounds or more. The spring 11 is overcome and the piston 9 moves back slightly, kicking back the valve stem 13 and uncovering, first the opening 6 leading from the exhaust of the brake cylinder, then the partial exhaust port 14, and lastly the full exhaust port 15. The air rushing in from the brake cylinder through the opening 6 gradually exhausts through the ports 14 and 15. By the time the air from the brake cylinder is exhausted and the brakes are released, the auxiliary reservoir has been fully charged. When it is desired to set the brakes again the train line pressure is reduced, and the triple valve is shifted to close communication between the train line pipe and the auxiliary reservoir and to close the exhaust from the brake cylinder. As the brakes are applied, the pressure in the auxiliary reservoir is reduced, and spring 11 retracts to its normal position, thus closing the valve 12. Whether the release piston is in release or normal position, it will be noted that the check valve is always held in closed position. This effectually guards against any leakage around the release piston head through the valve, which would tend to set the brakes when not desired. The partial and full release ports provide for a comparatively gradual and slow release from the brake cylinder.

I contemplate variations in the construction of valve 21; and the provision of any suitable plurality of exhaust ports 14, 15 in any desired relative arrangement to provide for a gradual release from the cylinder 3.

I claim:

1. In an automatic fluid pressure brake system, the combination of an auxiliary reservoir, a triple valve, a fluid pressure retaining means consisting of a release cylinder communicating with the auxiliary reservoir, a spring-pressed piston therein, a retaining cylinder communicating with the brake cylinder exhaust from the triple valve, and having one or more exhaust ports therein, a spring-pressed retaining valve mounted in the retaining cylinder and adapted to normally close all the openings in said cylinder, said releasing piston being adapted to contact with said retaining valve and unseat said valve, and a check valve on said piston adapted to be always held in closed position.

2. In an automatic fluid pressure brake system, the combination of an auxiliary reservoir, a triple valve, a fluid pressure retaining means consisting of a release cylinder communicating with the auxiliary reservoir, a spring-pressed piston therein, a retaining cylinder communicating with the brake cylinder exhaust from the triple valve and having partial and full exhaust ports therein, a spring-pressed retaining valve mounted in the retaining cylinder and adapted to normally close all the openings in said cylinder, said releasing piston being adapted to contact with said retaining valve and unseat said valve, and a check valve on said piston adapted to be always held in closed position.

3. In an automatic fluid pressure brake system, the combination of an auxiliary reservoir, a triple valve, a fluid pressure retaining means consisting of a release cylinder communicating with the auxiliary reservoir, a spring-pressed piston therein, a retaining cylinder communicating with the brake cylinder exhaust from the triple valve and having partial and full exhaust ports therein, and a spring-pressed retaining valve mounted in the retaining cylinder and adapted to normally close all the openings in said cylinder, said releasing piston being adapted to contact with said retaining valve and unseat said valve.

ARCHIE MILLIGAN.

Witnesses:
JAMES DRYSDALE,
RICHARD J. HOLLINS.